United States Patent [19]

Deering

[11] Patent Number: 5,408,605
[45] Date of Patent: * Apr. 18, 1995

[54] COMMAND PREPROCESSOR FOR A HIGH PERFORMANCE THREE DIMENSIONAL GRAPHICS ACCELERATOR

[75] Inventor: Michael F. Deering, Los Altos, Calif.

[73] Assignee: Sun Microsystems, Inc., Mountain View, Calif.

[*] Notice: The portion of the term of this patent subsequent to Feb. 21, 2012 has been disclaimed.

[21] Appl. No.: 74,031

[22] Filed: Jun. 4, 1993

[51] Int. Cl.⁶ .............................................. G06F 15/00
[52] U.S. Cl. .................................... 395/162; 395/119
[58] Field of Search ............... 395/133, 119, 138, 120, 395/139, 127, 142, 136, 143, 162–166, 250, 275, 425

[56] References Cited

U.S. PATENT DOCUMENTS 5,159,665  10/1992  Priem et al. .......................... 395/134
5,307,449  4/1994   Kelley et al. ......................... 395/143

*Primary Examiner*—Mark R. Powell
*Assistant Examiner*—Kee M. Tung
*Attorney, Agent, or Firm*—Blakely Sokoloff Taylor & Zafman

[57] ABSTRACT

A command preprocessor is disclosed that translates geometry input data from differing formats into a standard format for accelerated rendering. The command preprocessor contains a set of reformatting control registers that are preprogrammed with translation parameters by a host processor. The translation parameters in the reformatting control registers specify translation operations.

20 Claims, 12 Drawing Sheets

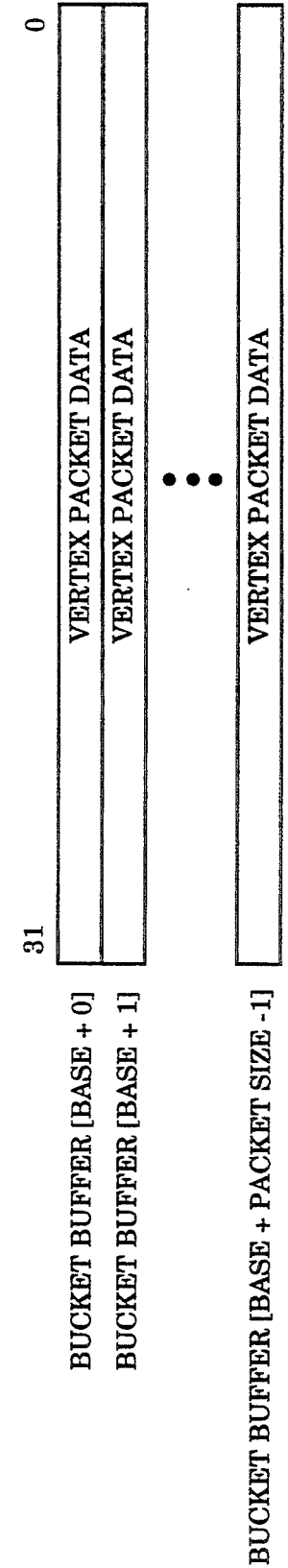

| VCS OP<7> | VCS OP<6> | VCS OP<5> | OPCODE DESCRIPTION |
|---|---|---|---|
| 0 | 0 | 0 | DATA<15:8> → FLOAT<31:0> (RED) |
| 0 | 0 | 1 | DATA<23:16> → FLOAT<31:0> (GREEN) |
| 0 | 1 | 0 | DATA<31:24> → FLOAT<31:0> (BLUE) |
| 0 | 1 | 1 | HEADER |
| 1 | 0 | 0 | DOUBLE FLOAT<63:0> → FLOAT<31:0> |
| 1 | 0 | 1 | DATA<31:0> → DATA<31:0> |
| 1 | 1 | 0 | DATA<15:0> → FLOAT<31:0>(Nx, Nz) |
| 1 | 1 | 1 | DATA<31:16> → FLOAT<31:0>(Ny) |

*Figure 5c*

| | 230 | |
|---|---|---|
| VERTEX BUFFER MEMORY [0] | TUPPLE 0, WORD 1 --- Px (VERTEX 1) | |
| VERTEX BUFFER MEMORY [1] | TUPPLE 0, WORD 2 --- Py (VERTEX 1) | |
| VERTEX BUFFER MEMORY [2] | TUPPLE 0, WORD 3 --- Pz (VERTEX 1) | |
| VERTEX BUFFER MEMORY [3] | TUPPLE 1, WORD 1 --- Nx (VERTEX 1) | |
| VERTEX BUFFER MEMORY [4] | TUPPLE 1, WORD 2 --- Ny (VERTEX 1) | |
| VERTEX BUFFER MEMORY [5] | TUPPLE 1, WORD 3 --- Nz (VERTEX 1) | |
| VERTEX BUFFER MEMORY [6] | TUPPLE 2, WORD 1 --- Cr (VERTEX 1) | |
| VERTEX BUFFER MEMORY [7] | TUPPLE 2, WORD 2 --- Cg (VERTEX 1) | |
| VERTEX BUFFER MEMORY [8] | TUPPLE 2, WORD 3 --- Cb (VERTEX 1) | |
| VERTEX BUFFER MEMORY [9] | TUPPLE 3, WORD 1 --- FACET Nx | |
| VERTEX BUFFER MEMORY [10] | TUPPLE 3, WORD 2 --- FACET Ny | |
| VERTEX BUFFER MEMORY [11] | TUPPLE 3, WORD 3 --- FACET Nz | |
| VERTEX BUFFER MEMORY [12-23] | (VERTEX 2) | |
| VERTEX BUFFER MEMORY [24-35] | (VERTEX 3) | |
| VERTEX BUFFER MEMORY [36-47] | (VERTEX 4) | |

| 0 | ALTERNATE VERTEX TUPPLE 1 [0] |
| | ALTERNATE VERTEX TUPPLE 1 [0] |
| 31 | ALTERNATE VERTEX TUPPLE 1 [0] |

VERTEX BUFFER MEMORY [48]
VERTEX BUFFER MEMORY [49]
VERTEX BUFFER MEMORY [50]

| 0 | ALTERNATE VERTEX TUPPLE 2 [0] |
| | ALTERNATE VERTEX TUPPLE 2 [0] |
| 31 | ALTERNATE VERTEX TUPPLE 2 [0] |

VERTEX BUFFER MEMORY [51]
VERTEX BUFFER MEMORY [52]
VERTEX BUFFER MEMORY [53]

| 0 | ALTERNATE VERTEX TUPPLE 3 [0] |
| | ALTERNATE VERTEX TUPPLE 3 [0] |
| 31 | ALTERNATE VERTEX TUPPLE 3 [0] |

VERTEX BUFFER MEMORY [54]
VERTEX BUFFER MEMORY [55]
VERTEX BUFFER MEMORY [56]

*Figure 6d*

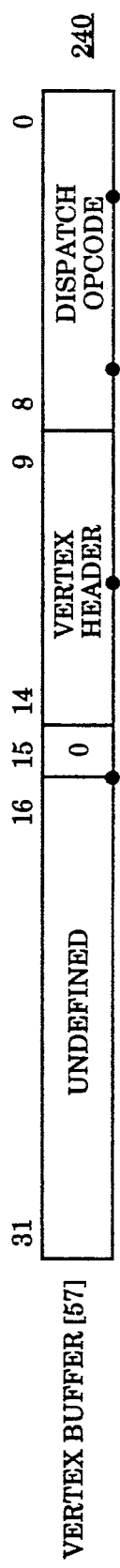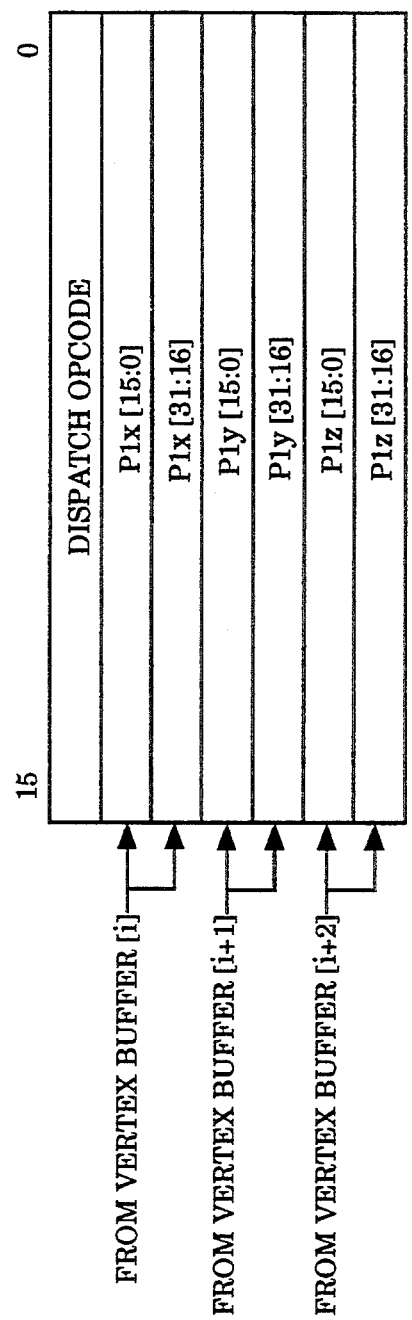
Figure 7a
Figure 7b

| OPCODE | FUNCTION | OPCODE | FUNCTION |
|---|---|---|---|
| 000 | COLD INITIALIZATION | 040 | PICKING ENABLED |
| 001 | PLAIN DOT | 041 | FACE CULLING METHOD |
| 002 | RGB DOT | 042 | USE BACK PROPS |
| 003 | DOT WITH NORMALS | 043 | FRONT LIGHTING DEGREE |
| 004 | DOT WITH RGB AND NORMALS | 044 | INVERSE VIEW MATRIX |
| 005 | PLAIN VECTOR | 045 | FACET NORMAL ENABLE |
| 006 | RGB VECTOR | 046 | FRONT SURFACE COLOR |
| 007 | VECTOR WITH NORMALS | 047 | BACK SURFACE COLOR |
| 008 | VECTOR WITH RGB AND NORMALS | 048 | EYE VECTOR PROPERTIES |
| 009 | TRIANGLE WITH NORMALS | 049 | FRONT MATERIAL PROPERTIES CACHED |
| 010 | TRIANGLE WITH RGB | 050 | BACK MATERIAL PROPERTIES CACHED |
| 011 | TRIANGLE WITH RGB & NORMALS | 051 | LIGHT SOURCES CACHED |
| 012 | HOLLOW TRIANGLE WITH NORMALS | 052 | FRONT MATERIAL PROPERTIES UNCACHED |
| 013 | HOLLOW TRIANGLE WITH RGB | 053 | BACK MATERIAL PROPERTIES UNCACHED |
| 014 | HOLLOW TRIANGLE WITH RGB & NORMALS | 054 | LIGHT SOURCES UNCACHED |
| 015 | RASTER DATA COPY | 055 | LIGHT COUNTERS |
| 016-031 | RESERVED FOR OTHER GEOMETRY FUNCTIONS (NURBS, ETC.) | 056 | FRONT SPECULAR COLOR |
| 032 | PASS THROUGH | 057 | BACK SPECULAR COLOR |
| 033 | LOAD CONTEXT | 058 | RASTER XY POSITION |
| 034 | STORE CONTEXT | 059 | MODEL CLIPPING ENABLED |
| 035 | MATRIX PROCESSING (NPC) | 060 | MODEL CLIP PLANES LOAD MATRIX |
| 036 | VIEW MATRIX PROCESSING (NPC) | 061 | DIAGNOSTIC MODE (SUNDIAG SRAM SELFTEST) |
| 037 | POKE MATRIX | 062 | READ MICRO REV LEVEL |
| 038 | MATRIX PROCESSING (LC) | 063 | BUILD DOT BRANCH TABLES |
| 039 | NOT USED | 064 | BUILD VECTOR BRANCH TABLES |
| 065 | BUILD TRIANGLE BRANCH TABLE | 068-080 | RESERVED |
| 066 | BACK LIGHT DEGREE | 081-128 | UNDEFINED |
| 067 | MODEL CLIPPING NUMBER | | |

| 31 | | | | | | | | | 11 | 10 | |
|---|---|---|---|---|---|---|---|---|---|---|---|
| UNDEFINED | | | | | | | | | | PASS THROUGH DMA MODE | |

| 9 | 8 | 7 | 6 | 5 | 4 | 3 | 2 | 1 | 0 |
|---|---|---|---|---|---|---|---|---|---|
| PASS THROUGH HEADER COUNTER ENABLE | | PIPELINE ORDER | PACKET OUTPUT | UNICAST SELECT | | PACKET DESTINATION | | PACKET TYPE | |

| 31 | | | 10 |
|---|---|---|---|
| UNDEFINED | | | |

| 9 | 8 | 7 | 6 | 5 | 4 | 3 | 2 | 1 | 0 |
|---|---|---|---|---|---|---|---|---|---|
| TUPPLE SUBSTITUTE ENABLE | | TUPPLE REPLICATE ENABLE | | | VERTEX FLOAT TO FIXED COMPRESSION | | | VERTEX FORMAT | |

| 8 | 7 | 6 | 5 | 4 | 3 | 2 | 1 | 0 |
|---|---|---|---|---|---|---|---|---|
| INCREMENT CEN | | HOLLOW EDGE CONTROL | | COUNTER CLOCKWISE | GENERAL TRIANGLE LIST CONTROL | | DRAW OTHER EDGE | DRAW EDGE |

| 31 | 0 |
|---|---|
| XGL CONSTANT VALUE | |

COMMAND PREPROCESSOR FOR A HIGH PERFORMANCE THREE DIMENSIONAL GRAPHICS ACCELERATOR

BACKGROUND OF THE INVENTION

1. Field of the Invention

This invention relates to the field of computer graphics systems. More particularly, this invention relates to a command preprocessor for a high performance three dimensional graphics accelerator in a computer system.

2. Art Background

A three dimensional graphics accelerator is a specialized graphics rendering subsystem for a computer system. An application program executing on a host processor of the computer system generates three dimensional geometry input data that defines three dimensional graphics elements for display on a display device. The application program typically transfers the geometry input data from the host processor to the graphics accelerator. Thereafter, the graphics accelerator renders the corresponding graphics elements on the display device.

A typical application program generates the three dimensional geometry input data according to a predefined format for defining three dimensional graphics elements. An example of a predefined format is the PHIGS standard. However, a proliferation of differing predefined formats and variations of existing formats has recently occurred. A high performance graphics accelerator is typically required to support many of the differing predefined formats, even though the differing formats define similar drawing functions.

Some prior graphics systems support the differing predefined formats by micro-coding the graphics accelerator to process geometry data according to many of the differing predefined formats. In such systems, the graphics accelerator includes micro-code tasks for disassembling and translating the differing formats prior to rendering the corresponding graphics elements. Unfortunately, such micro-code tasks greatly increase the size and complexity of the graphics accelerator micro-code, thereby increasing graphics accelerator cost and decreasing rendering performance.

Other prior graphics systems support the differing predefined formats by employing the host processor to translate the differing formats into a simplified format for the graphics accelerator. Unfortunately, the format translation by the host processor is a system bottleneck that may severely decrease throughput to the graphics accelerator, thereby decreasing overall graphics system performance.

As will be described, the present invention is a command preprocessor in a graphics accelerator that translates the differing geometry input data formats into a common format, thereby enabling a higher performance and relatively low cost graphics accelerator.

SUMMARY OF THE INVENTION

A command preprocessor for a high performance three dimensional graphics accelerator in a computer system is disclosed. The command preprocessor translates geometry input data from differing formats into a standard reformatted vertex packet. The command preprocessor implements both a 3D geometry pipeline and a direct port data pipeline.

The 3D geometry pipeline of the command preprocessor accesses an input vertex packet over a host bus using either programmed input/output or direct memory access. The command preprocessor reformats the input vertex packet into a reformatted vertex packet, and then transfers the reformatted vertex packet over a floating-point bus as an output geometry packet with optional data substitutions and data compression.

The command preprocessor contains a set of reformatting control registers. A host processor preprograms a set of translation parameters into the reformatting control registers. The translation parameters in the reformatting control registers specify translation operations and a data format for the reformatted vertex packets.

The command preprocessor accesses input vertex packets over the host bus according to a direct memory access protocol. The input vertex packets contain geometry input data that defines graphics primitives. The command preprocessor stores the input vertex packets in a bucket buffer.

The command preprocessor generates reformatted geometry packets by reading the geometry input data from the bucket buffer, and translating the geometry input data according to the translation parameters specified in the reformatting control registers. The command preprocessor stores the reformatted geometry packets in a set of vertex registers.

The command preprocessor generates the output geometry packets by reading the reformatted geometry data from the vertex registers and performing tupple substitution and data compression according to the parameters specified in the reformatting control registers.

The translation parameters specify whether the reformatted vertex packet contains a primitive for a triangle, a vector, or a dot, such that the primitive for a triangle comprises three vertices in the reformatted vertex packet, the primitive for a vector contains two vertices in the reformatted vertex packet, and the primitive for a dot contains one vertex in the reformatted vertex packet.

The translation parameters specify a set of source tupples from the bucket buffer for the reformatted vertex packet. The translation parameters specify a source for a header of the reformatted vertex packet. The translation parameters specify a reordering of vertices contained in the input vertex packet in the bucket buffer. The translation parameters specify data conversion operations on the geometry input data.

BRIEF DESCRIPTION OF THE DRAWINGS

FIG. 4a illustrates a vertex mode control register contained in the input vertex packet logic that controls preparation of reformatted vertex packets for the floating-point processors.

FIG. 4b illustrates an arrangement of the bucket buffer which is loaded with input vertex packets through DMA or programmed I/O transfers of the over the host bus.

FIG. 5c is a table that defines the data conversion functions for each of the packet opcodes for one embodiment.

FIG. 6a illustrates the format of the vertex buffer portion of the vertex buffer, which is shown holding an example set of vertex data and identifying tupples.

FIG. 6b-6d illustrate the alternate vertex tupple buffers which hold alternate tupple data that replaces the tupples of the reformatted vertex packet under control of an output format register.

FIG. 7a illustrates the floating-point processor dispatch register which holds a floating-point processor micro-code dispatch field that is attached to the beginning of all reformatted vertex packets.

FIG. 7b illustrates an example dispatch opcode field and a reformatted t vertex packet transferred from the vertex buffer portion to one of the floating-point processors over the CF_BUS.

FIG. 8 illustrates the dispatch opcode values and corresponding floating-point processor functions for one embodiment.

FIG. 9d illustrates the format of the pass through mode control register which controls the processing of pass through packets by the command preprocessor for transfer to the floating-point processors.

FIG. 10a illustrates the output format register which determines the format of the reformatted vertex packets for transfer to the floating-point processors.

FIG. 10b illustrates the auxiliary vertex header register, wherein the contents of the auxiliary vertex header register provides a header if the VCS opcode register does not contain a header opcode.

FIG. 10c illustrates the XGL constant register which is programmed with a constant value, and wherein the command preprocessor inserts the constant value into the vertex buffer when a header opcode is encountered in any of the VCS opcode registers other than the first VCS opcode register.

DETAILED DESCRIPTION OF THE INVENTION

A command preprocessor for a high performance three dimensional graphics accelerator in a computer system is disclosed. In the following description for purposes of explanation specific applications, numbers, apparatus, configurations and circuits are set forth in order to provide a thorough understanding of the present invention. However, it will be apparent to one skilled in the art that the present invention may be practiced without these specific details. In other instances well known systems are shown in diagrammatical or block diagram form in order not to obscure the present invention unnecessarily.

Figure 1:
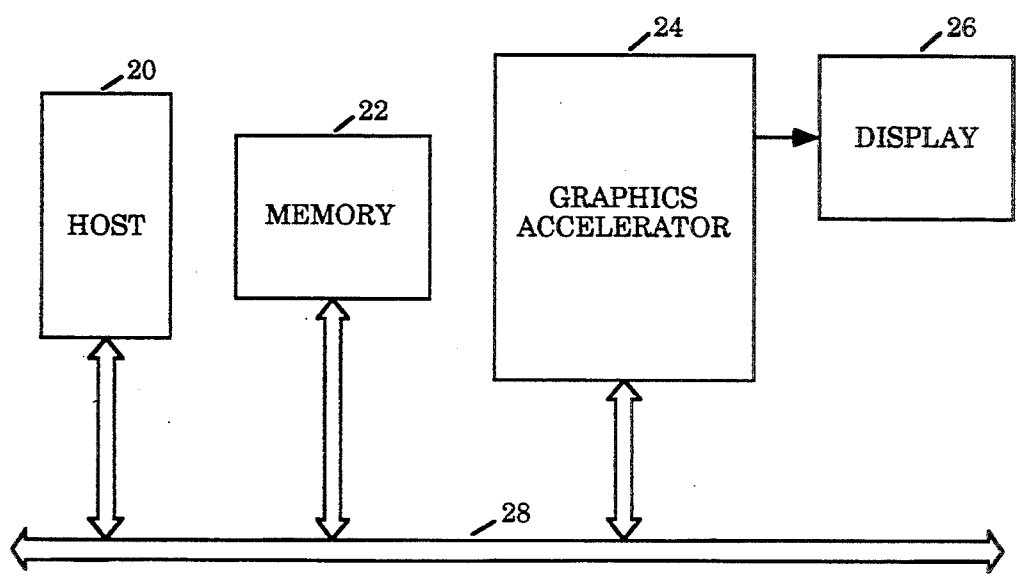
FIG. 1 is a block diagram of a computer system including a host processor, a memory subsystem, a graphics accelerator, and a display device.

Referring now to FIG. 1, a block diagram of a computer system is shown, including a host processor 20, a memory subsystem 22, a graphics accelerator 24, and a display device 26. The host processor 20, the memory subsystem 22, and the graphics accelerator 24 are each coupled for communication over a host bus 28.

The display device 26 represents a wide variety of raster display monitors. The host processor 20 represents a wide variety of computer processors, multiprocessors and CPUs, and the memory subsystem 22 represents a wide variety of memory subsystems including random access memories and mass storage devices. The host bus 28 represents a wide variety of communication or host computer busses for communication between host processors, CPUs, and memory subsystems, as well as specialized subsystems.

The host processor 20 transfers information to and from the graphics accelerator 24 according to a programmed input/output (I/O) protocol over the host bus 28. Also, the graphics accelerator 24 accesses the memory subsystem 22 according to a direct memory access (DMA) protocol.

A graphics application program executing on the host processor 20 generates geometry data arrays containing three dimensional geometry information that define an image for display on the display device 26. The host processor 20 transfers the geometry data arrays to the memory subsystem 22. Thereafter, the graphics accelerator 24 reads in geometry data arrays using DMA access cycles over the host bus 28. Alternatively, the host processor 20 transfers the geometry data arrays to the graphics accelerator 24 with programmed I/O over the host bus 28.

The three dimensional geometry information in the geometry data arrays comprises a stream of input vertex packets containing vertex coordinates (vertices), and other information that defines triangles, vectors and points in a three dimensional space which is commonly referred to as model space. Each input vertex packet may contain any combination of three dimensional vertex information, including vertex normal, vertex color, facet normal, facet color, texture map coordinates, pick id's, headers and other information.

A headerless input vertex packet may define a triangle strip in the form of a "zig zag" pattern of adjacent triangles. A headerless input vertex packet may also define a triangle strip in the form of a "star strip" pattern of triangles. In addition, a headerless input vertex packet may define a strip of isolated triangles. An input vertex packet having a header may change triangle strip formats for each triangle and change between "zig zag" format, "star" format, and isolated triangles.

Figure 2:
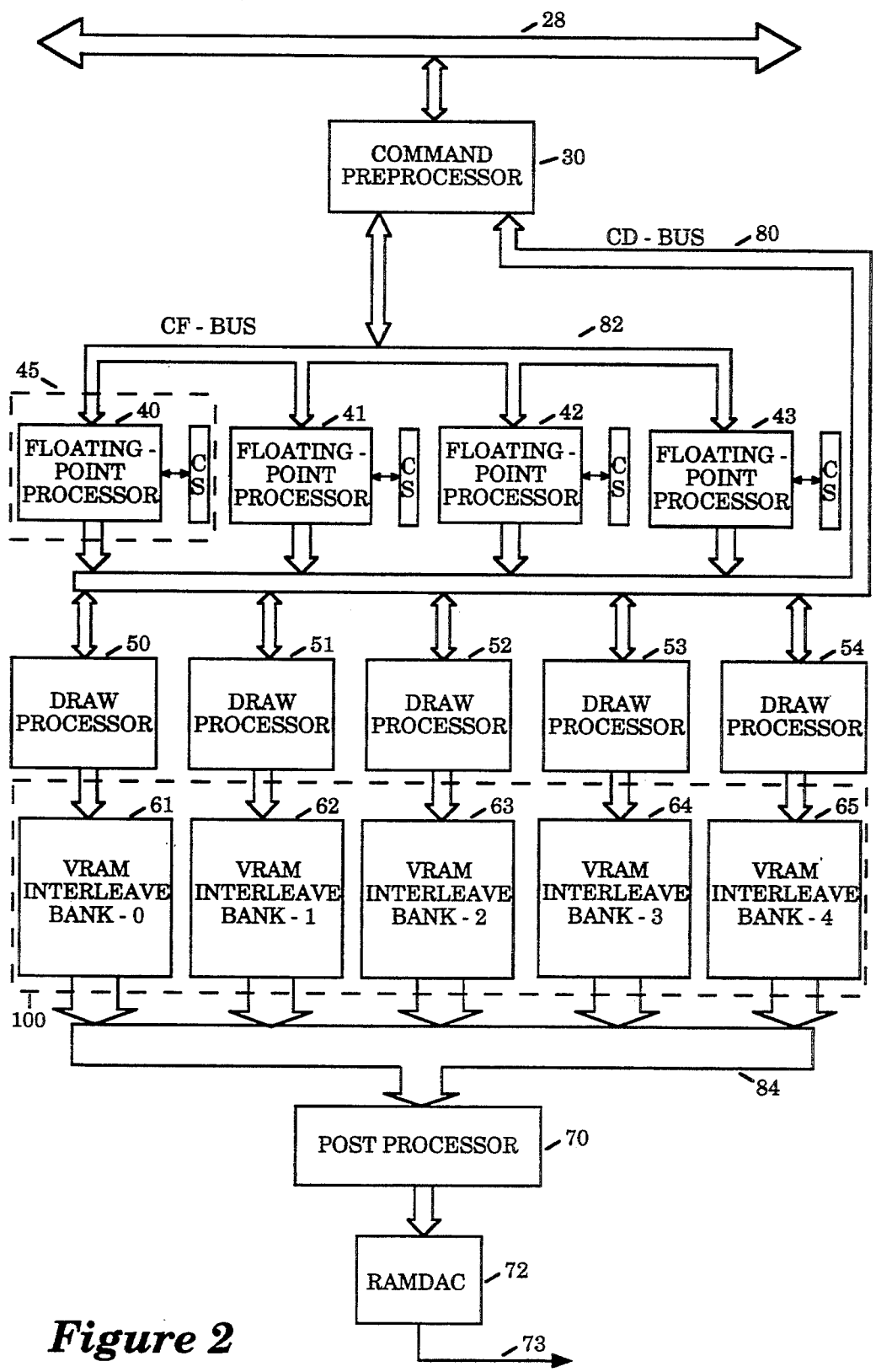
FIG. 2 is a block diagram of the graphics accelerator, which is comprised of a command preprocessor, a set of floating-point processors, a set of draw processors, a frame buffer, a post-processor, and a random access memory/digital-to-analog converter (RAMDAC).

FIG. 2 is a block diagram of the graphics accelerator 24. The graphics accelerator 24 is comprised of a command preprocessor 30, a set of floating-point processors 40–43, a set of draw processors 50–54, a frame buffer 100, a post-processor 70 and a random access memory/digital-to-analog converter (RAMDAC) 72. The RAMDAC 72 is similar to commercially available RAMDACs that implement look-up table functions. For one embodiment, the command preprocessor 30, the floating-point processors 40–43, the draw processors 50–54, and the post-processor 70 are each individual integrated circuit chips.

The command preprocessor 30 is coupled for communication over the host bus 28. The command preprocessor 30 performs DMA reads of the geometry data arrays from the memory subsystem 22 over the host bus 28. The host processor 20 transfers virtual memory pointers to the command preprocessor 30. The virtual memory pointers point to the geometry data arrays in the memory subsystem 22. The command preprocessor 30 converts the virtual memory pointers to physical memory addresses for performing the DMA reads to the memory subsystem 22 without intervention from the host processor 20.

The command preprocessor 30 implements two data pipelines; a 3D geometry pipeline, and a direct port pipeline.

In the direct port pipeline, the command preprocessor 30 receives direct port data over the host bus 28, and transfers the direct port data over a command-to-draw bus (CD-BUS) 80 to the draw processors 50–54. The direct port data is optionally processed by the command preprocessor 30 to perform X11 functions such as character writes, screen scrolls, and block moves in concert with the draw processors 50–54. The direct port data may also include register writes to the draw processors 50–54, and individual pixel writes to the frame buffer 100.

In the 3D geometry pipeline, the command preprocessor 30 accesses a stream of input vertex packets from the geometry data arrays, reorders the information contained within the input vertex packets, and optionally deletes information in the input vertex packets. The command preprocessor 30 reorders the information from the input vertex packet into reformatted vertex packets having a standardized element order. The command preprocessor 30 then transfers output geometry packets over a command-to-floating-point bus (CF-BUS) 82 to one of the floating-point processors 40–43. The output geometry packets comprise the reformatted vertex packets with optional modifications and data substitutions.

The command preprocessor 30 converts the information in each input vertex packet from differing number formats into the 32 bit IEEE floating-point number format. The command preprocessor 30 converts 8 bit fixed-point numbers, 16 bit fixed-point numbers, and 32 bit or 64 bit IEEE floating-point numbers.

The command preprocessor 30 either reformats or inserts header fields, inserts constants, and generates and inserts sequential pick-id's. The command preprocessor 30 examines the chaining bits of the header and reassembles the information from the input vertex packets into the reformatted vertex packets containing completely isolated geometry primitives including points, lines and triangles.

The command preprocessor 30 transfers output geometry packets over a command-to-floating-point bus (CF-BUS) 82 to one of the floating-point processors 40–43. The command preprocessor 30 receives control and status signals from the floating-point processors 40–43 over a control portion of the CF_BUS 82. The control and status signals indicate the availability of input buffers within the floating-point processors 40–43 for receiving the output geometry packets.

The floating-point processors 40–43 are each substantially similar. Each floating-point processor 40–43 implements a 32 bit micro-code driven floating-point core, along with parallel input and output packet communication hardware. Each of the floating-point processors 40–43 implements floating-point functions including multiply, ALU, reciprocal, reciprocal square-root, and integer operations. Each floating-point processor 40–43 implements a wide assortment of specialized graphics instructions and features. Each floating-point processor 40–43 is optimized to implement the number of fast internal registers required to perform the largest common three dimensional graphics processing micro-code inner loop implemented by the graphics accelerator 24.

For one embodiment, each floating-point processor 40–43 is implemented on a single integrated circuit chip. The only support chips required for each floating-point processor 40–43 is a set of four external SRAM chips that provide an external micro-code in a control store (CS).

Each floating-point processor 40–43 implements a function for setting up triangles for scan conversion by the draw processors 50–54. The first step of the setup function includes the step of sorting the three vertices of a triangle in ascending y order. Each floating-point processors 40–43 broadcasts draw packets to all of the draw processors 50–54 over the CD-BUS 80. The draw packets comprises final geometry primitives, including triangles, points and lines.

The draw processors 50–54 function as VRAM control chips for the frame buffer 100. The draw processors 50–54 concurrently render an image into the frame buffer 100 according to an draw packet received from one of the floating-point processors 40–43 or according to a direct port packet received from the command preprocessor 30.

Each draw processor 50–54 performs the scan conversion functions of edgewalking function and scan interpolation. The replication of the edgewalking and scan interpolation functions among the draw processors 50–54 obviates the need for large scale communication pathways between separate edgewalking and scan interpolation processors, thereby minimizing the pin counts of each of the draw processors 50–54 and decreasing printed circuit board space requirements.

The frame buffer 100 is arranged as a set of 5 VRAM interleave banks. The draw processor 50 writes pixel data into an interleave bank_0 61, the draw processor 51 writes pixel data into an interleave bank_1 62, the draw processor 52 writes pixel data into an interleave bank_2 63, the draw processor 53 writes pixel data into an interleave bank_3 64, the draw processor 54 writes pixel data into an interleave bank_4 65.

Each draw processor 50–54 renders only the pixels visible within the corresponding interleave bank 61–65. The draw processors 50–54 concurrently render the triangle primitive defined by an draw packet to produce the correct combined rasterized image in the frame buffer 100. Each draw processor 50–54 rasterizes every fifth pixel along each scan line of the final rasterized image. Each draw processor 50–54 starts a scan line biased by 0, 1, 2, 3, or 4 pixel spaces to the right.

Each draw processor 50–54 optionally performs depth cueing. Each pixel of a triangle, vector or dot rendered may be depth cued within the draw processors 50–54 without the performance penalty of prior graphics systems that perform depth cueing in floating-point processors. Each draw processor 50–54 optionally performs rectangular window clipping, blending and other pixel processing functions.

The post-processor 70 receives interleaved pixel data from the frame buffer 100 over the video bus 84. The post-processor 70 performs color look-up table and cursor functions. The RAMDAC 72 converts the pixel data received from the post-processor 70 into video signals 73 for the display device 26.

Figure 3:
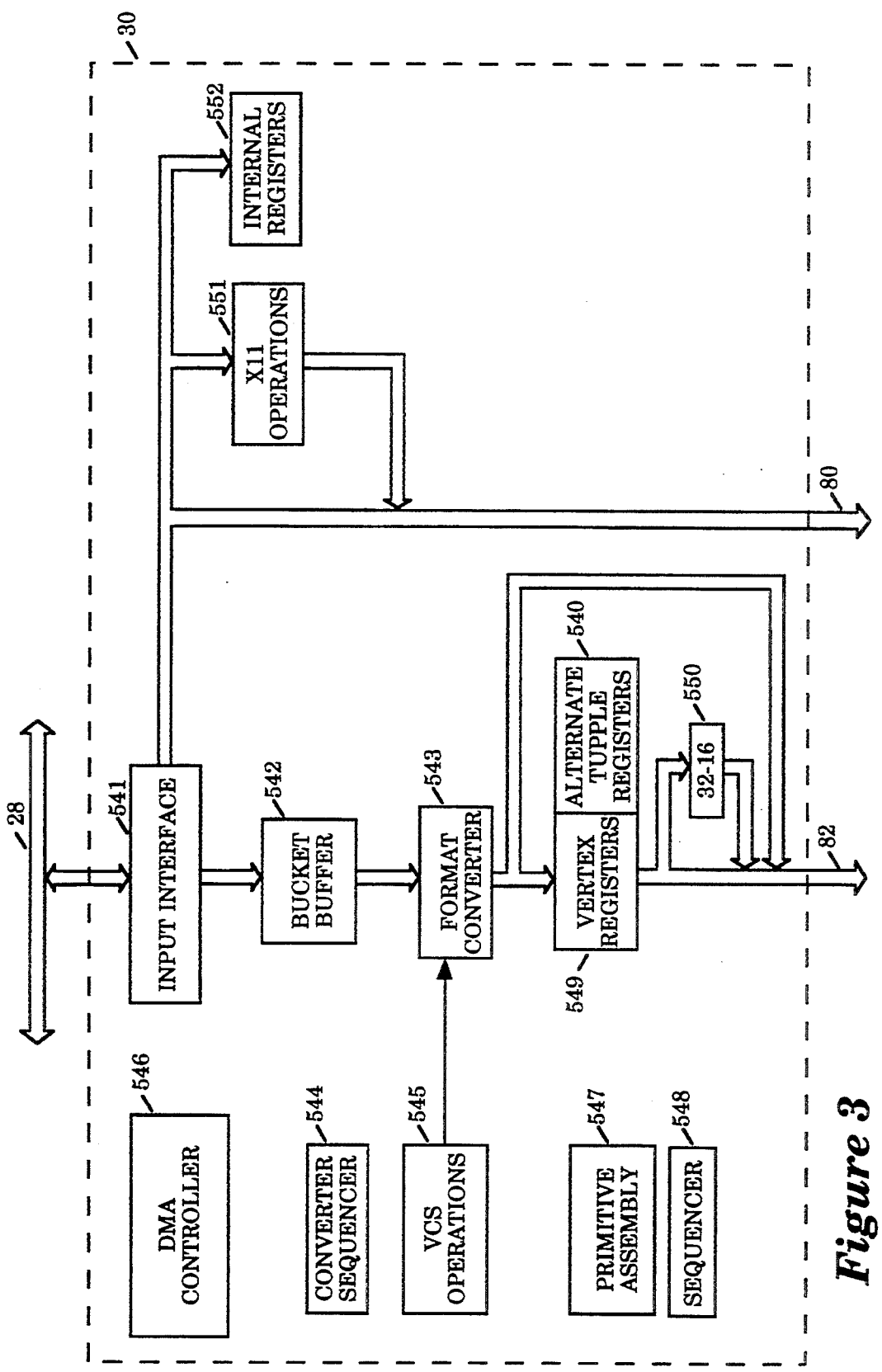
FIG. 3 is a block diagram of the command preprocessor which shows the reformatting circuitry of the 3D geometry pipeline, along with the direct port pipeline.

FIG. 3 is a block diagram of the command preprocessor 30. The command preprocessor 30 is shown coupled to the host bus 28 for communication through the 3D geometry pipeline and the direct port pipeline. For one embodiment, the command preprocessor 30 is implemented on a single integrated circuit chip.

The direct port pipeline comprises an input interface 541 and an X11 operations circuit 551. The input interface 541 receives direct port data over the host bus 28, and transfers the direct port data over the CD-BUS 80 to the draw processors 50–54. The direct port data includes register writes to the draw processors 50–54 and individual pixel writes to the frame buffer 100. The direct port data is optionally transferred to the X11 operations circuit 551 to perform X11 functions such as character writes, screen scrolls, and block moves in concert with the draw processors 50–54.

The 3D geometry pipeline comprises the input interface 541, a bucket buffer 542, a format converter 543, a vertex buffer comprising a set of vertex registers 549 and alternate tupple registers 540. Format conversion in the 3D geometry pipeline is controlled by a VCS operations circuit 545 and a converter sequencer 544. Output geometry packets are assembled by a primitive assembly circuit 547 and a sequencer 548. A 32-16 circuit 550 optionally performs data compression. A set of internal registers 552 are programmed over the host bus 28 to control the operations of the 3D geometry pipeline and the direct port pipeline. A DMA controller 546 performs DMA transfers into the bucket buffer 542 over the host bus 28.

The input interface 541 contains a burst buffer for interfacing between the differing clocking environments of the host bus 28 and the command preprocessor 30. The burst buffer functions as a set of temporary holding registers for input vertex packets transferred into the bucket buffer 542.

The format converter circuit 543 accesses the input vertex packets from the bucket buffer 542, and assembles the reformatted vertex packets into the vertex registers 549. The format converter circuit 543 is controlled by the VCS operations circuit 545 according to preprogrammed format conversion operations. The format conversion is sequenced by the converter sequencer 544.

The primitive assembly circuit 547 under control of the sequencer 548 accesses the reformatted vertex packets from the vertex registers 549, and transfers the output geometry packets over the CF-BUS 82. The primitive assembly circuit 547 optionally substitutes alternate tupples from the alternate tupple registers 540. The primitive assembly circuit 547 also optionally performs data compression on data in the output geometry packets using the 32-16 circuit 550.

The format converter 543 processes input vertex packets that define a triangle strip. Header bits in each input vertex packet specify a replacement type. The replacement type defines the combination of a subsequent input vertex packet with previous input vertex packets to form a next triangle in the triangle strip. The format converter 543 implements a register stack that holds the last three vertices in the triangle strip. The format converter 543 labels the last three vertices in the triangle strip as the oldest, the middlest, and the newest.

A triangle strip with a "zig-zag" pattern corresponds to a new input vertex packet having a header that specifies the replacement type replace_oldest. The replacement type replace_oldest causes the format converter 543 to replace the oldest vertex by the middlest, and to replace the middlest vertex by the newest, and to set the newest vertex to the vertex in the new input vertex packet. The foregoing pattern corresponds to a PHIGS_PLUS simple triangle strip.

A triangle strip with a "star" pattern corresponds to a new input vertex packet having a header that specifies the replacement type replace_middlest. The replacement type replace_middlest causes the format converter 543 to leave the oldest vertex unchanged, to replace the middlest vertex by the newest vertex, and to set the newest vertex to the vertex in the new input vertex packet.

To begin a generalized triangle strip, a new input vertex packet has a header that specifies the replacement type restart. The replacement type restart causes the format converter 543 to mark the oldest and the middlest vertices as invalid, and to set the newest vertex to the vertex in the new input vertex packet.

The primitive assembly circuit 547 transfers an output geometry packet for a triangle from the vertex registers 549 and alternate tupple registers 540 over the CF-BUS 82 whenever a replacement operation generates three valid vertices in the vertex registers 549.

The restart replacement type in the header of a input vertex packet corresponds to a move operation for polylines. The restart replacement type enables a single data structure, the geometry data array in the memory subsystem 22, to specify multiple unconnected variable length triangle strips. Such a capability reduces the overhead required for starting a DMA sequence over the host bus 28.

The replacement types in the input vertex packets received by the command preprocessor 30 from the geometry data array in the memory subsystem enables a triangle strip to change from a "zig zag" pattern to a "star" pattern in the middle of the strip. Such a capability enables the representation of complex geometry in a compact data structure while requiring minimal input data bandwidth over the host bus 28.

The format converter 543 rearranges the vertex order in the vertex registers 549 after every replace_oldest replacement type to normalize the facing of the output triangles in the reformatted vertex packets. The primitive assembly circuit 547 rearranges the vertex order as the vertex is transferred out of the vertex registers 549 such that the front face of the output triangle is always defined by a clockwise vertex order.

A header bit in a input vertex packet specifies an initial face ordering of each triangle strip. In addition, the command preprocessor 30 contains a register with a state bit which causes reversal of the initial face ordering specified in the header. An application program executing on the host processor 20 maintains the state bit to reflect a model matrix maintained by the application program. Also, the command preprocessor 30 reverses the face ordering for every triangle in a "zig-zag" pattern.

The primitive assembly circuit 547 transfers each reformatted vertex packet from the vertex registers 549 to a next available floating-point processor 40–43. The next available floating-point processor 40–43 is determined by sensing input buffer status of each floating-point processor 40–43 over a control portion of the CF-BUS 82.

The command preprocessor 30 maintains a record or "scoreboard" of the ordering of transfer of each reformatted vertex packet to the floating-point processors 40–43. The command preprocessor 30 controls the output buffers of the floating-point processors 40–43 by transferring control signals over a control portion of the CD-BUS 80. The command preprocessor 30 ensures that the reformatted vertex packets are processed through the floating-point processors 40–43 in the proper order when a sequential rendering order is required. If sequential rendering is not required, then the first draw packet at the output of the floating-point processors 40–43 is rendered first.

The format converter 543 also reformats polylines and poly-polylines. In addition, the format converter 543 optionally converts triangle strip data into polyline edges. Such a capability reduces the complexity of the micro-code for the floating-point processors 40–43 because triangle processing is not mixed with line processing during operations that require triangle edge highlighting.

To process edge highlighting of triangles within a triangle strip, the command preprocessor 30 assembles the input vertex packets for the triangle strip into reformatted vertex packets, and passes the reformatted vertex packets to the floating-point processors 40–43 over the CF-BUS 82 as output geometry packets. Thereafter, the command preprocessor 30 accesses the original triangle strip input vertex packets over the host bus 28, and assembles the input vertex packets into reformatted vertex packets containing isolated vectors representing highlighted edges. The command preprocessor 30 then processes the isolated vectors through the floating-point processors 40–43 and the draw processors 50–54 to perform the highlighting function.

For one embodiment the data portion of the CF-BUS 82 is 16 bits wide, and the data portion of the CD-BUS 80 is 16 bits wide. The command preprocessor 30 optionally compresses color and normal data components of the reformatted vertex packets using the 32–16 circuit 550 before transfer to the floating-point processors 40–43 over the CF-BUS 82. The 32–16 circuit 550 compresses the color and normal data from 32 bit IEEE floating-point format into 16 fixed-point format. Thereafter, the floating-point processors 40–43 receive the reformatted vertex packets with the compressed color and normal data components, and decompress the color and normal components back into 32 bit IEEE floating-point values.

The compression of color and normal data components of the reformatted vertex packets does not substantially affect the ultimate image quality for the graphics accelerator 24 because the color components of the reformatted vertex packets are represented as eight bit values in the frame buffer 100. Similarly, normal components of the reformatted vertex packets having a 16 bit unsigned accuracy represent a resolution of approximately plus or minus one inch at one mile. On the other hand, the data compression of color and normal components of the reformatted vertex packets reduces the data transfer bandwidth over the CF-BUS 82 by approximately 25 percent.

FIG. 4a illustrates a vertex mode control register 200. The vertex mode control register 200 is contained in the internal registers 552. The contents of the vertex mode control register 200 controls preparation of reformatted vertex packets and output geometry packets. The vertex mode control register 200 includes a vertex type field that specifies whether the reformatted vertex packet contains a primitive for a triangle, a vector, or a dot. A triangle primitive contains three vertices per reformatted vertex packet, a vector contains two vertices for each reformatted vertex packet, and a dot contains one vertex for each reformatted vertex packet.

The vertex mode control register 200 includes a vertex format field that specifies a source tupple arrangement from the bucket buffer 542 for a reformatted vertex packet. The format converter 543 and the primitive assembly circuit 547 assembles source tupples from the bucket buffer 542, and possibly inserts facet tupples, and possibly substitutes alternate tupples, and formats the tupple values. The example below shows an arrangement for a generic output geometry packet for a triangle that the command preprocessor 30 transfers to the Floating-point Processor Dispatch;
| | |
|---|---|
| First Vertex Tupple 0; | VPx, VPy, VPz |
| First Vertex Tupple 1; | VNx, VNy, VNz (optional) |
| First Vertex Tupple 2; | VCr, VCg, VCb (optional) |
| Second Vertex Tupple 0; | VPx, VPy, VPz |
| Second Vertex Tupple 1; | VNx, VNy, VNz (optional) |
| Second Vertex Tupple 2; | VCr, VCg, VCb (optional) |
| Third Vertex Tupple 0; | VPx, VPy, VPz |
| Third Vertex Tupple 1; | VNx, VNy, VNz (optional) |
| Third Vertex Tupple 2; | VCr, VCg, VCb (optional) |
| Header Source Vertex Tupple 3; | FNx, FNy, FNz (optional) | where,
VP is Vertex Position
VN is Vertex Normal
VC is Vertex Color
FN is Facet Normal.

The first, second, and third vertices of the above example are the three vertices of the current triangle in the vertex registers 549 and do not correspond to particular locations in the vertex registers 549. The vertex mode control register 200 includes a header source field that specifies a source for the header of the output geometry packet. When colors are present and not normals, the colors can reside in tupple 1.

The vertex mode control register 200 includes a backface function bit which causes reversal of the normal triangle vertex ordering. The header of the first triangle of a strip contains the counter clockwise (CCW) bit, which specifies the ordering of triangle vertices sent to the floating-point processors 40–43. The backface function bit affects the remainder of the triangle strip. The first triangle of the strip is sent out based on the initial setting. Any subsequent triangle formed by replacing the middle vertex (V2), retains the same vertex ordering. A triangle formed by replacing the oldest vertex (V1) reverses the triangle vertex ordering. A restart is the same as starting a new strip in that it loads the CCW bit again.

The bit fields for the vertex mode control register 200 are defined below:
D<19> = Triangle Shared Edge Mode

---

0  Use normal triangle mode to set the floating-point processor dispatch register edge/hollow flags. The first triangle gets all three edge/hollow bits set and all subsequent triangles only have two edge bits set and the third bit is always zero.
1  All three edge/hollow bits are sent for every triangle.

D<18> = Sub-element PID Count with Header Code (used in conjunction with bits 7:5).
D<17> = Header Source

| | |
|---|---|
| 0 | Use header from newest vertex; also use pick ID, replicate from, and get tupple 3 from newest. |
| 1 | Use header from oldest vertex; also use pick ID, replicate from, and get tupple 3 from oldest. |

D<16:12> = Input Packet Size

| | |
|---|---|
| 00010 | Packet size is three words. |
| 00011 | Packet size is four words. |
| 11111 | Packet size is 32 words. |

D<11> = Vertex DMA Mode

The vertex DMA mode bit selects the DMA mode or immediate mode of operation when the vertex mode is set by accessing a start vertex mode register.

| | |
|---|---|
| 0 | Immediate Mode |
| 1 | DMA Mode |

D<10> = Disjoint Mode

The disjoint mode bit specifies whether to treat each vertex pair as a separate vector (i.e. create vectors between V1,V2 and V3,V4 but not between V2,V3). The disjoint mode bit applies only when the vertex type=-vector.

| | |
|---|---|
| 0 | Polyline Mode: newest vertex and previous vertex defines vector |
| 1 | Disjoint Mode: very two vertices is a disjoint vector (restart after other vertex) |
| C<9> = | Edge Mode Control |
| 0 | Edge Mode inactive |
| 1 | Edge Mode enabled |

D<8> = Backface Function

The backface function bit is set to reverse the normal triangle vertex ordering. The backface function bit causes reversal of the counterclockwise (CCW) bit in the header and reversal of the order of vertex 1 and vertex 2 in the reformatted vertex packet. The backface function bit applies only when the Vertex Type=triangle.

| | |
|---|---|
| 0 | Send triangle vertices in the order specified by the current setting of the internal CCW bit |
| 1 | Send triangle vertices in the opposite order as that specified by the current setting of the internal CCW bit |

D<7:5> = Sub-element Pick ID Control

| | |
|---|---|
| xxx0 | Don't send Pick ID to the floating-point processors 40–43 |
| xxx1 | Enable sending Pick ID to the floating-point processors 40–43 |
| xx0x | Use Pick ID from vertex header |
| xx1x | Use Pick ID from sub-element Pick ID register |
| x0xx | Increment sub-element Pick ID register per primitive |
| x1xx | Increment sub-element Pick ID register per vertex |

| | |
|---|---|
| 0xxx | Vertex header bit 7 is not used for incrementing the sub-element Pick ID register |
| 1xxx | Increment sub-element Pick ID register if Vertex header but 7 is 1 (if Vertex header bit 7 is 0, do not increment) |

D<4> = Facet Normal Enable

The facet normal enable bit specifies whether to append the facet value (typically a facet normal) after the last vertex.

| | |
|---|---|
| 0 | Don't send facet data in the reformatted vertex packets |
| 1 | Append facet from facet data of the vertex that is the source for the header. Always appended at the end of the reformatted vertex packet. |

D<3:2> = Vertex Format

| | |
|---|---|
| 00 | XYZ + Tupple 1 + Tupple 2 |
| 01 | XYZ + Tupple 1 |
| 1x | XYZ |

D<1:0> = Vertex Type

| | |
|---|---|
| 00 | reserved |
| 01 | Dot |
| 10 | Vector |
| 11 | Triangle |

FIG. 4b illustrates an arrangement of the bucket buffer 542. The bucket buffer 542 is loaded with input vertex packets through DMA or programmed I/O transfers of the over the host bus 28. The format converter 543 accesses the input vertex packets from the bucket buffer 542, and assembles the reformatted vertex packets into the vertex registers 549.

The vertex control sequencer (VCS) 135 contains a VCS opcode count register and four VCS opcode registers. The VCS opcode registers contain up to 13 opcodes (VCS OP[0] through VCS OP[12]).

Figure 5A:
FIG. 5a illustrates a VCS opcode count register which is programmed with a VCS opcode count field that determines the number of VCS opcodes executed while the format conversion circuit of the command preprocessor processes vertex data from the bucket buffer to the vertex buffer.

FIG. 5a illustrates a VCS opcode count register 210, which is contained in the internal registers 552. The vertex control sequencer (VCS) opcode count field determines the number of VCS opcodes executed while the format converter 543 processes vertex data from the bucket buffer 542 to the vertex registers 549.

Figure 5B:
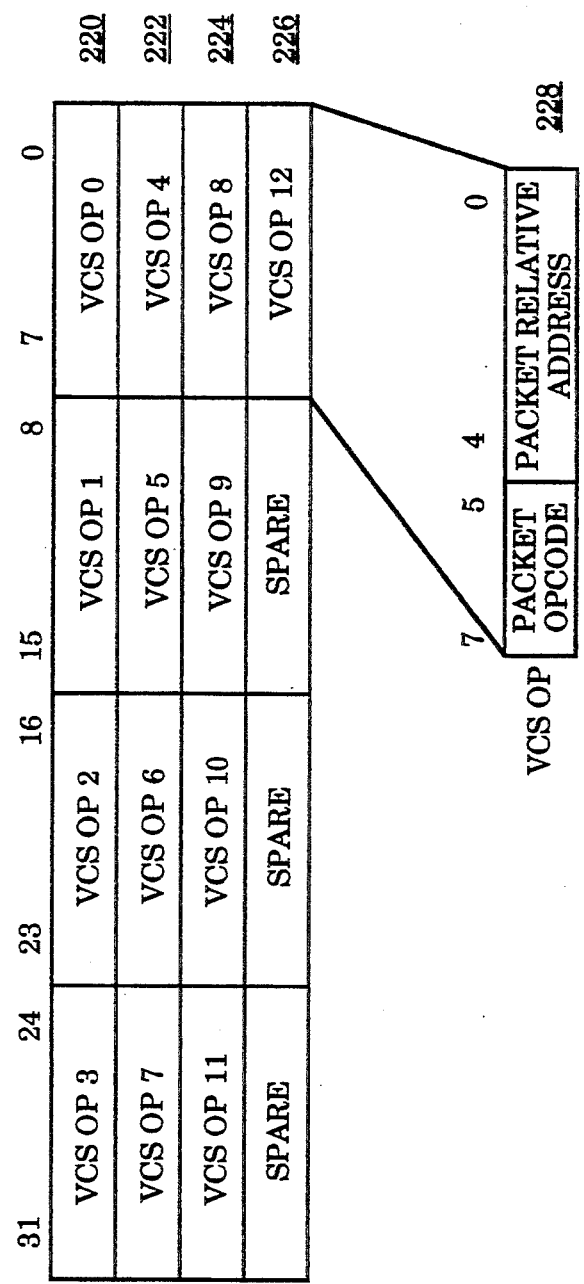
FIG. 5b illustrates a set of VCS opcode registers which are programmed with opcodes VCS OP[0] through VCS OP[12] that control the manipulation of data by the format conversion circuit of the command preprocessor.

FIG. 5b illustrates a set of VCS opcode registers 220–226, which are contained in the internal registers 552. The opcodes VCS OP[0] through VCS OP[12] control the manipulation of data by the format conversion circuit of the command preprocessor 30. The opcodes VCS OP[0] through VCS OP[12] direct the order that the data is read out of the bucket buffer 542, and determines the conversions applied to the data during transfer to the vertex registers 549.

The format converter 543 processes the opcodes in the following order: VCS OP[0] ... VCS OP[12]. Each VCS OP, such as an example VCS OP 228, consists of a packet opcode and a packet relative address. The packet opcode controls the format conversion. The packet relative address is the address of the input data word relative to the packet base address in the bucket buffer 542.

FIG. 5c is a table that defines the data conversion functions for each of the packet opcodes for one embodiment. For example, the packet opcode 000 causes the format converter 543 to access bits 8–15 of the input vertex packet data from the specified packet relative address, to convert the specified bits to 32 bit floating-point format, and to transfer the converted data to the vertex registers 549.

The header opcode (i.e. opcode 011) causes different actions by the format converter 543 depending on the location of the header opcode within the VCS opcode registers 220–226. If the header opcode is placed in the first of the VCS opcode register 220, the header value from the input vertex packet in the bucket buffer 542 is transferred to the vertex registers 549 as the vertex header for the reformatted vertex packet.

If the VCS opcode register 220 does not contain a header opcode, the contents of an auxiliary vertex header register (described below) are used as the vertex header for the reformatted vertex packet. The header in the auxiliary vertex header register is used when a constant header is required. In addition, for VCS OPS after the first, the contents of an XGL constant register (described below) are inserted into the reformatted vertex packet. The XGL constant register used is for cases requiring placement of an extra constant into a data stream, for example, the insertion of a Z value into a 2-D input data stream to generate a 3-D data stream.

The vertex registers 549 comprises a vertex buffer portion, a three-word alternate vertex tupple 1 buffer, a three-word alternate vertex tupple 2 buffer, a three-word alternate vertex tupple 3 buffer, a floating-point processor dispatch register, a pass through header register, a sub-element pick ID register, and a pass through mode control register.

FIG. 6a illustrates the format of the vertex buffer portion 230. The vertex buffer is shown holding an example set of vertex data and identifying tupples. The vertex buffer portion 230 is partitioned into four segments of 12 32-bit words. Each 12-word segment holds the x, y, z data, normal data, and color data for one vertex. The vertex buffer portion 230 can hold up to four vertices.

The format converter 543 assembles vertices for reformatted vertex packets into the vertex buffer portion 230 according to the opcodes VCS OP[0]through VCS OP[12]. The opcodes VCS OP[0 ] through VCS OP[12 ] direct the order that the data is read out of the bucket buffer 542, and determines the conversions applied to generate vertex data in the vertex buffer portion 230. When enough vertices are gathered for a primitive, the vertices are gathered into a reformatted vertex packet, and transferred from the command preprocessor 30 to one of the floating-point processors 40–43 over the CF_BUS 82.

FIG. 6b illustrates the alternate vertex tupple 1 buffer 232. The primitive assembly circuit 547 substitutes the alternate tupple I data in the alternate vertex tupple 1 buffer 240 for the first tupple of the reformatted vertex packet under control of an output format register (described below). The alternate vertex tupple 1 buffer 240 comprises words 48, 49, and 50 of the vertex registers 549.

FIG. 6c illustrates the alternate vertex tupple 2 buffer 234. The primitive assembly circuit 547 substitutes the alternate tupple 2 data for the second tupple of the reformatted vertex packet under control of the output format register. The alternate vertex tupple 2 buffer 234 comprises words 51, 52, and 53 of the vertex registers 549.

FIG. 6d illustrates the alternate vertex tupple 3 buffer 236. The primitive assembly circuit 547 substitutes the alternate tupple 3 data for the third tupple of the reformatted vertex packet under control of the output format register. The alternate vertex tupple 3 buffer 236 comprises words 54, 55, and 56 of the vertex registers 549.

FIG. 7a illustrates the floating-point processor dispatch register 240. The contents of the floating-point processor dispatch register are attached to the beginning of all reformatted vertex packets. The contents of the floating-point processor dispatch register 240, followed by a reformatted vertex packet from the vertex buffer portion 230 are transferred to one of the floating-point processors 40–43 over the CF_BUS 82. The dispatch opcode field is the dispatch address to the micro-code of the floating-point processors 40–43.

FIG. 7b illustrates an example dispatch opcode field followed by a reformatted vertex packet transferred from the vertex buffer portion 230 to one of the floating-point processors 40–43 over the CF_BUS 82.

The bit fields for the floating-point processor dispatch register 240 are defined below:

$D<14:9>$ = Vertex Header

The vertex header contains two types of bits: (1) highlight edge bits, which are rendered with edge color if the corresponding bit is on (and the edge mode is active), and (2) hollow ridge bits, which are rendered in hollow triangles (with lighted colors) if the corresponding bit is on. The vertex 1 is the oldest, the vertex 2 is the middlest, and the vertex 3 is the newest vertex.

$D<14>$ = Hollow edge between vertices 1 and 2
$D<13>$ = Hollow edge between vertices 3 and 1
$D<12>$ = Hollow edge between vertices 2 and 3
$D<10>$ = Draw highlighted edge between vertices 1 and 2
$D<10>$ = Draw highlighted edge between vertices 3 and 1
$D<9>$ = Draw highlighted edge between vertices 2 and 3
$D<8:0>$ = Dispatch Opcode The dispatch opcode field is the dispatch address to the micro-code in the floating-point processors 40–43. FIG. 8 illustrates the dispatch opcode values and corresponding floating-point processor 40–43 functions for one embodiment.

Figure 9A:
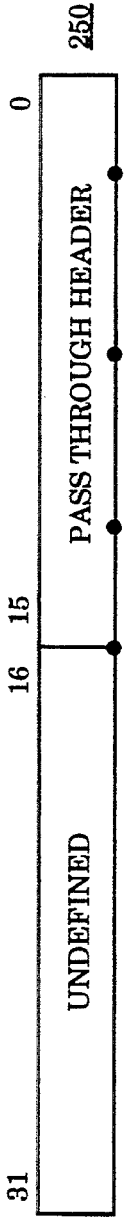
FIG. 9a illustrates the format of the pass through header register, wherein the pass through header field is attached to the beginning of the reformatted vertex packet sent to one of the floating-point processors for pass through packets.

FIG. 9a illustrates the format of the pass through header register 250. The pass through header field of the pass through header register 250 is attached to the beginning of the reformatted vertex packet sent to one of the floating-point processors 40–43 for pass through packets.

Figure 9B:
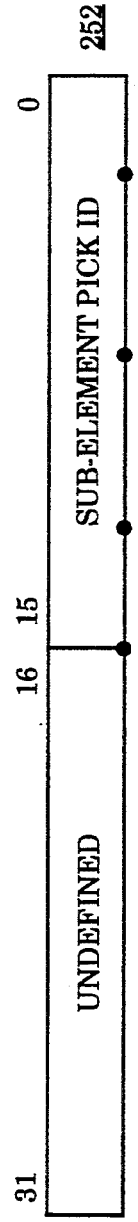
FIG. 9b illustrates the format of the sub-element pick ID register which is programmed with either a sub-element pick ID or a pass through packet count value.

FIG. 9b illustrates the format of the sub-element pick ID register 252. The sub-element pick ID register 252 is programmed with either a sub-element pick ID or a pass through packet count value.

Figure 9C:
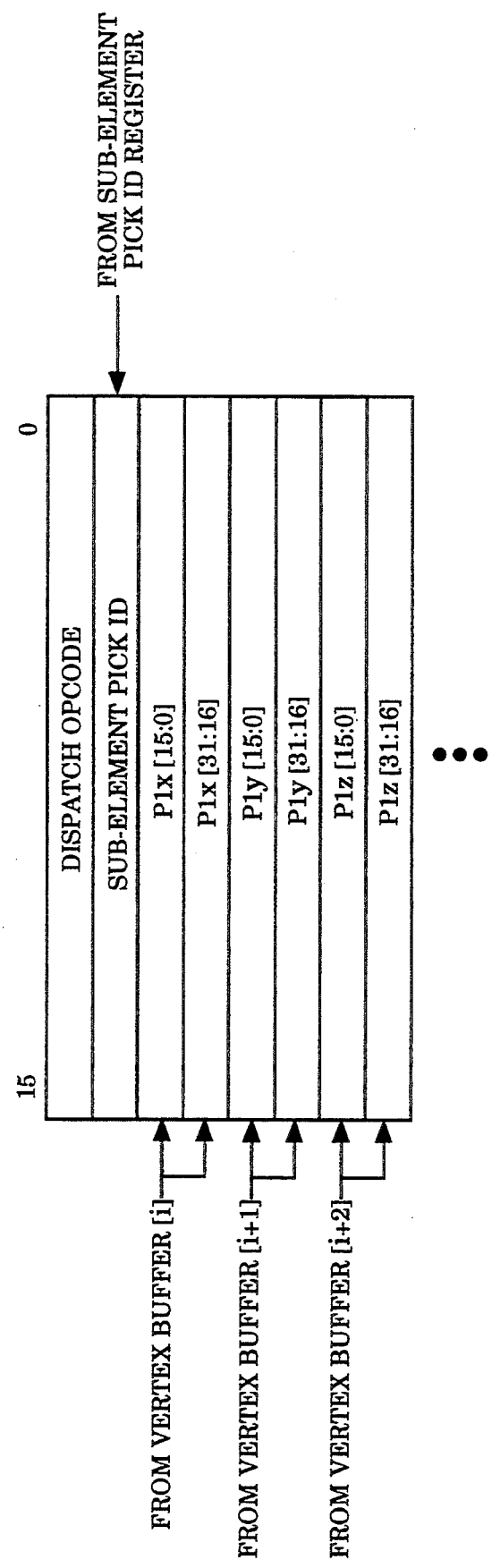
FIG. 9c shows an example reformatted vertex packet containing a sub-element pick ID value.

When the sub-element pick ID register 252 contains a sub-element pick ID, the command preprocessor 30 creates an alternate pick code for the reformatted vertex packets sent to the floating-point processors 40–43. The primitive assembly circuit 547 inserts the sub-element pick ID into each reformatted vertex packet and increments the sub-element pick ID value as controlled by bits in the vertex header register and the vertex mode control register 200. FIG. 9c shows an example output geometry packet containing a sub-element pick ID value.

For pass through mode, the command preprocessor 30 loads a count value into the sub-element pick ID register 252 that identifies the reformatted vertex packets transferred to the floating-point processors 40–43. The typical use for a counter value in the sub-element pick ID register 252 is the transfer of pass through packets during a raster copy, wherein the counter value identifies the packet transferred to the floating-point processors 40–43. The value of the counter value in the sub-element pick ID register 252 is incremented for each packet transferred.

FIG. 9d illustrates the format of the pass through mode control register 260. The contents of the pass through mode control register 260 determine the processing of pass through packets by the command preprocessor 30 for transfer to the floating-point processors 40–43.

The bit fields for the pass through mode control register 260 are defined below:

D<10> = Pass Through DMA Mode

The pass through DMA mode field specifies whether the contents of the pass through header register 250 and the contents of the sub-element pick ID register 252 are included in the pass through packet.

| | |
|---|---|
| 00 | Send packet as is, where the number of words (n) is the packet size field in the vertex mode control register 200: n words of data. |
| 01 | Attach header from the pass through header register 250: header + n words of data. |
| 1x | Attach header from the pass through header register 250 and count value from the sub-element pick ID register 252 header + counter value + n words of data. |

D<7> = Pipeline Order

The pipeline order bit specifies whether the scoreboard logic of the command preprocessor 30 maintains the packet order, i.e. transfers draw packets from the floating-point processors 40–43 to the draw processors 50–54 in the same order as the corresponding reformatted vertex packets are transferred from the command preprocessor 30 to the floating-point processors 40–43.

| | |
|---|---|
| 0 | Ordered primitive processing -- order of packets into and out of the floating-point processors 40–43 is identical. |
| 1 | Unordered primitive processing -- order is not kept for packets out of the floating-point processors 40–43. |

D<6> = Packet Output

The packet output bit specifies whether the pass through packet may generate one or more draw packets from one of the floating-point processors 40–43.

| | |
|---|---|
| 0 | Output not expected from one of the floating-point processors 40–43 corresponding to the pass through packet. |
| 1 | Output expected corresponding to the pass through packet. |

D<5:4> = Unicast Select

The unicast select field specifies one of the floating-point processors 40–43 for the pass through packet.

| | |
|---|---|
| 00 | Floating-point processor 40 |
| 01 | Floating-point processor 41 |
| 10 | Floating-point processor 42 |
| 11 | Floating-point processor 43 |

D<3:2> = Packet Destination

| | |
|---|---|
| 00 | Unicast (send to next available floating-point processor) |
| 01 | Unicast (send to a specific floating-point processor) |
| 10 | Unicast (send to the same floating-point processor as the preceding packet) |
| 11 | Multicast (broadcast to all floating-point processors 40–43). The multicast packets are used to send attributes to floating-point processors 40–43. |

D<1:0> = Packet Type

| | |
|---|---|
| 0x | Normal Pass Through |
| 10 | Read the firmware memory (floating-point processor SRAM) |
| 11 | Write the firmware memory (floating-point processor SRAM). |

FIG. 10a illustrates an output format register 262, which is contained in the internal registers 552. The output format register 262 determines the format of the reformatted vertex packets for transfer to the floating-point processors 40–43.

The bit fields for the output format register 262 are defined below:

D<9:7> = Tupple Substitute Enable

The tupple substitute enable field specifies whether to replace a source tupple with an alternate vertex tupple. The tupple substitute enable function is used, for example, during a pick echo or during highlighting, where the vertex color is substituted with a constant highlight color from the alternate vertex tupple.

| | |
|---|---|
| 000 | Disable substitution |
| xx1 | Substitution alternate vertex tupple 1 |
| x1x | Substitution alternate vertex tupple 2 |
| 1xx | Substitution alternate vertex tupple 3 |

D<6:5> = Tupple Replicate Enable

The tupple replicate enable field specifies whether to replicate the appropriate tupple of the vertex data into the reformatted vertex packet. The tupple replicate function is used, for example, to replicate facet data (which is in the vertex of the header source) into the vertex data.

| | |
|---|---|
| 00 | Disable replicate |
| x1 | Replicate tupple 1, use tupple from vertex of the header source |
| 1x | Replicate tupple 2, use tupple from vertex of the header source |

D<4:2> = Vertex Float To Fixed Compression

The vertex float to fixed compression field specifies whether to compress the tupples. The 32–16 circuit compresses the tupples by converting the 32-bit float values of the vertex buffer into 16-bit fixed values before prior to transfer over the CF_BUS 82.

| | |
|---|---|
| 0xx | Send tupple 3 without compression |
| 1xx | Compress tupple 3 from 32-bit float to 16-bit fixed point |
| x0x | Send tupple 2 without compression |
| x1x | Compress tupple 2 from 32-bit float to 16-bit fixed point |
| xx0 | Send tupple 1 without compression |
| xx1 | Compress tupple 1 from 32-bit float to 16-bit fixed point |

D<1:0> = Vertex Format

The vertex format field specifies the tupple count.

| | |
|---|---|
| 00 | Header + XYZ + Tupple 1 + Tupple 2 |
| 01 | Header + XYZ + Tupple 1 |
| 1x | Header + XYZ |

The internal registers 552 include an auxiliary vertex header register 264 and an XGL constant register 268. FIG. 10b illustrates the auxiliary vertex header register 264. The contents of the auxiliary vertex header register 264 provides a header if the VCS opcode register 220 does not contain a header opcode.

The bit fields for the auxiliary vertex header register 264 are defined below:

D<7> = Increment CEN

The increment CEN bit specifies whether to increment the current element number in the pick ID register 252.

D<6:5> = Hollow Edge Control

| | |
|---|---|
| x1 | Draw hollow edge. For triangles, draw a hollow edge from the newest vertex to the second oldest vertex. |
| 1x | Draw the other hollow edge. For triangles, draw a hollow edge from the newest vertex to the oldest vertex. |

D<4> = Counter Clockwise

| | |
|---|---|
| 0 | Define triangle as clockwise (Vold, Vmid, Vnew) |
| 1 | Define triangle as counter-clockwise (Vold, Vnew, Vmid) |

D<3:2> = General Triangle List Control

| | |
|---|---|
| 00 | Restart the triangle strip |
| 01 | Replace the oldest vertex |
| 10 | Replace the second oldest vertex |
| 11 | Undefined |

D<1> = Draw Other Edge

For triangles, the draw other edge bit specifies whether to draw an edge from the newest vertex to the oldest vertex.

D<0> = Draw Edge

For triangles, the draw edge bit specifies whether to draw an edge from the newest vertex to the second oldest vertex. For lines, the draw edge bit specifies whether to draw a line from the newest vertex to the previous vertex. A draw edge value of 0 is equivalent to a "move" and a draw edge value of 1 is equivalent to a "draw".

FIG. 10c illustrates the XGL constant register 268. The command preprocessor 30 inserts the contents of the XGL constant register 268 into the vertex registers 549 when a header opcode is encountered in any of the VCS opcode registers 222-226.

In the foregoing specification the invention has been described with reference to specific exemplary embodiments thereof it will, however, be evident that various modifications and changes may be made thereto without departing from the broader spirit and scope of the invention as set forth in the appended claims. The specification and drawings are accordingly to be regarded as illustrative rather than restrictive.

What is claimed is:

1. A command preprocessor for translating differing formats of graphics data into a standard geometry data format for accelerated rendering by a graphics accelerator, the command preprocessor having circuitry for accessing an input vertex packet containing a set of geometry data that specifies a geometry object according to a first geometry data format, the command preprocessor having circuitry for generating a reformatted vertex packet by translating the geometry data of the input vertex packet from the first geometry data format into the standard geometry data format recognized by the graphics accelerator.

2. The command preprocessor of claim 1, wherein the circuitry for accessing the input vertex packet performs a direct memory access over a host bus to read the input vertex packet from a geometry data array stored in a memory subsystem coupled to a host bus.

3. The command preprocessor of claim 2, wherein the geometry data array specifies a triangle strip that includes the geometry object and wherein the circuitry for generating the reformatted vertex packet generates an isolated geometry primitive from the triangle strip.

4. The command preprocessor of claim 1, wherein the circuitry for accessing the input vertex packet receives programmed input/output accesses containing the geometry data over a host bus from a processor coupled to the host bus.

5. The command preprocessor of claim 1, further comprising a set of control registers for storing a set of translation parameters that control the translation of the geometry data from the first geometry data format to the standard geometry data format wherein the control registers are written via a host bus coupled to the command preprocessor.

6. The command preprocessor of claim 1, wherein the input vertex packet contains a packet header that specifies an ordering of a set of vertices for the geometry object defined by the geometry data, and wherein the circuitry for generating the reformatted vertex packet includes circuitry for reordering the vertices to an ordering required in the standard geometry data format.

7. The command preprocessor of claim 1, wherein the circuitry for generating the reformatted vertex packet includes circuitry for generating a header for the reformatted vertex packet that conforms to the standard geometry data format.

8. The command preprocessor of claim 1, further comprising a set of registers for storing alternate tupple data values including constant values and wherein the geometry data includes a set of tupple data values, and wherein circuitry for generating the reformatted vertex packet includes circuitry for substituting the alternate tupple data values for the tupple data values.

9. The command preprocessor of claim 1, wherein the geometry data includes a set of data values for the geometry object, and wherein the circuitry for generating the reformatted vertex packet includes circuitry for compressing the data values to conform to the standard geometry data format.

10. The command preprocessor of claim 1, further comprising circuitry for generating a sequential pick identifier, and wherein circuitry for generating the reformatted vertex packet includes circuitry for inserting the sequential pick identifier into the reformatted vertex packet.

11. A method for translating differing formats of graphics data into a standard geometry data format for a graphics accelerator, comprising the steps of:

accessing an input vertex packet containing a set of geometry data that specifies a geometry object according to a first geometry data format;

generating a reformatted vertex packet by translating the geometry data of the input vertex packet from the first geometry data format into the standard geometry data format recognized by the graphics accelerator.

12. The method of claim 11, wherein the step of accessing the input vertex packet comprises the step of performing a direct memory access over a host bus to read the input vertex packet from a geometry data array stored in a memory subsystem coupled to a host bus.

13. The method of claim 12, wherein the geometry data array specifies a triangle strip that includes the geometry object and wherein the step of generating the reformatted vertex packet comprises the step of generating an isolated geometry primitive from the triangle strip.

14. The method of claim 11, wherein the step of accessing the input vertex packet comprises the step of receiving a series of programmed input/output accesses containing the geometry data over a host bus from a processor coupled to the host bus.

15. The method of claim 11, wherein the step of generating a reformatted vertex packet by translating the geometry data is controlled by a set of translation parameters preselected to control a set of conversion function on the geometry data having the first geometry data format.

16. The method of claim 11, wherein the input vertex packet contains a packet header that specifies an ordering of a set of vertices for the geometry object defined by the geometry data, and wherein the step of generating the reformatted vertex packet comprises the step of reordering the vertices to an ordering required in the standard geometry data format.

17. The method of claim 11, wherein the step of generating the reformatted vertex packet comprises the step of determining a header for the reformatted vertex packet that conforms to the standard geometry data format.

18. The method of claim 11, wherein the geometry data includes a set of tupple data values, and wherein the step of generating the reformatted vertex packet comprises the step of substituting a set of alternate tupple data values for the tupple data values.

19. The method of claim 11, wherein the geometry data includes a set of data values for the geometry object, and wherein the step of generating the reformatted vertex packet comprises the step of compressing the data values to conform to the standard geometry data format.

20. The method of claim 11, further comprising the steps of generating a sequential pick identifier, and inserting the sequential pick identifier into the reformatted vertex packet.

* * * * *